United States Patent [19]
Adler et al.

[11] Patent Number: 6,157,630
[45] Date of Patent: Dec. 5, 2000

[54] COMMUNICATIONS SYSTEM WITH RADIO DEVICE AND SERVER

[75] Inventors: Alfred Adler; Robert Lee Hyder, both of Alpharetta, Ga.

[73] Assignee: Motorola, Inc., Schaumburg, Ill.

[21] Appl. No.: 09/013,439

[22] Filed: Jan. 26, 1998

[51] Int. Cl.[7] .................................................. H04Q 7/24
[52] U.S. Cl. ........................ 370/338; 370/401; 709/206; 709/219
[58] Field of Search ..................................... 370/338, 401; 709/201, 202, 203, 217, 218, 219, 249, 204, 206; 455/466, 458

[56]  References Cited

U.S. PATENT DOCUMENTS

| 4,833,701 | 5/1989  | Comroe et al.   | 370/338 |
|-----------|---------|-----------------|---------|
| 5,457,680 | 10/1995 | Kamm et al.     | 370/338 |
| 5,475,689 | 12/1995 | Kay et al.      | 370/338 |
| 5,949,775 | 9/1999  | Rautiola et al. | 370/338 |
| 5,964,833 | 10/1999 | Kikinis         | 709/206 |
| 6,026,292 | 2/2000  | Coppinger et al.| 455/406 |
| 6,061,570 | 5/2000  | Janow           | 455/458 |
| 6,073,165 | 6/2000  | Narasimhan et al.| 709/206 |

*Primary Examiner*—Ricky Ngo
*Attorney, Agent, or Firm*—Hugh C. Dunlop; Romi N. Rose

[57]  ABSTRACT

A communications system having a first server (205) with an electronic mail (e-mail) database for managing e-mail accounts, for storing radio device addresses associated with those accounts, and for storing electronic mail messages associated with those accounts. Each message has a header and text. A gateway connects the first server to a two-way radio network. A radio device (200) has a electronic messaging application. The radio device is capable of two-way communication over the two-way radio network. The first server comprises message handling software arranged to send, to the radio device, a portion of a message of a predetermined size, including a header portion and a text portion. The radio device (200) can request more of a message.

6 Claims, 5 Drawing Sheets

COMMUNICATIONS SYSTEM WITH RADIO DEVICE AND SERVER

FIELD OF THE INVENTION

This invention relates to a communications system with a radio device and a server. Separately and in addition, it relates to a radio device (e.g., a pager) for such a system having certain software referred to as "Client" software and a server having certain software referred to as "Server" software. A radio communications system such as (but not limited to) an asymmetric public two-way paging system connects the radio device and the server.

BACKGROUND OF THE INVENTION

There is an increasing demand for businessmen, professionals and ordinary consumers to have greater access to communications on the move. Paging systems have become very popular for communications, enabling a user to carry a lightweight, low cost device that has good wide-area and in-building penetration. In the past, paging systems have suffered from the disadvantage of being one-way only, but recently Motorola, Inc. has introduced the "Reflex" asymmetric two-way paging system which enables a user to respond to incoming messages. Asymmetric systems are particularly beneficial for sending out to the pager volumes of data that exceed the volumes expected to be sent back. They are particularly suited to the sending back of short acknowledgments or tags identifying "canned" responses (such as "OK" or "I'm unable to reply right now").

Simultaneously with the development of asymmetric two-way paging systems, symmetric two-way data systems such as the 'ARDIS' (trademark) system have developed, enabling significant volumes of data to be sent in both directions over a nationwide public data system.

It is known to provide remote electronic mail (e-mail) connection between a private e-mail server and a portable computer using a two-way radio modem such as a "Personal Messenger 100D" (trademark) modem manufactured by Motorola, Inc. Such an arrangement is shown in FIG. 1. The modem 106 is plugged into a PCMCIA slot of a portable computer 105 and a two-way connection to the private e-mail server is established (almost like establishment of a two-way telephone modem link) between a portable computer and its host server. The connection is via a base station 120 and a public network server 110 of the public two-way radio network 130. In such an arrangement, the computer behaves just as if it were connected by a wireless local area network (LAN) to the server, except that the connection is slow (low band width and high latency). A screen will appear on the portable computer 105 showing the entire contents of an "in" box maintained at the host server 115, with message types, sender names, times of receipt and the like. By selecting a particular message (using a mouse or otherwise), a command is sent to the server causing the entire message to be downloaded to the portable computer.

Such two-way radio messaging systems tend to be expensive, partly because of the cost of providing a significant bandwidth radio channel which is largely dedicated (at a given time) to the user. Another contribution to the high cost is the separate modem and portable computer.

There is a need for a convenient and inexpensive way to access a private e-mail server over a radio system.

DETAILED DESCRIPTION OF THE PREFERRED EMBODIMENT

Figure 1:
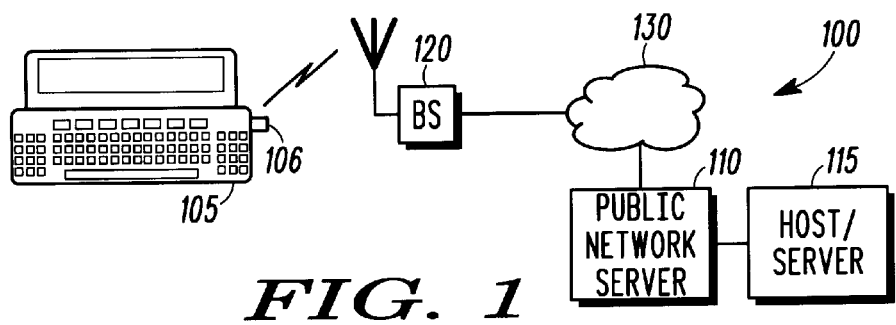
FIG. 1 shows a prior art two-way radio communication system.
Figure 2:
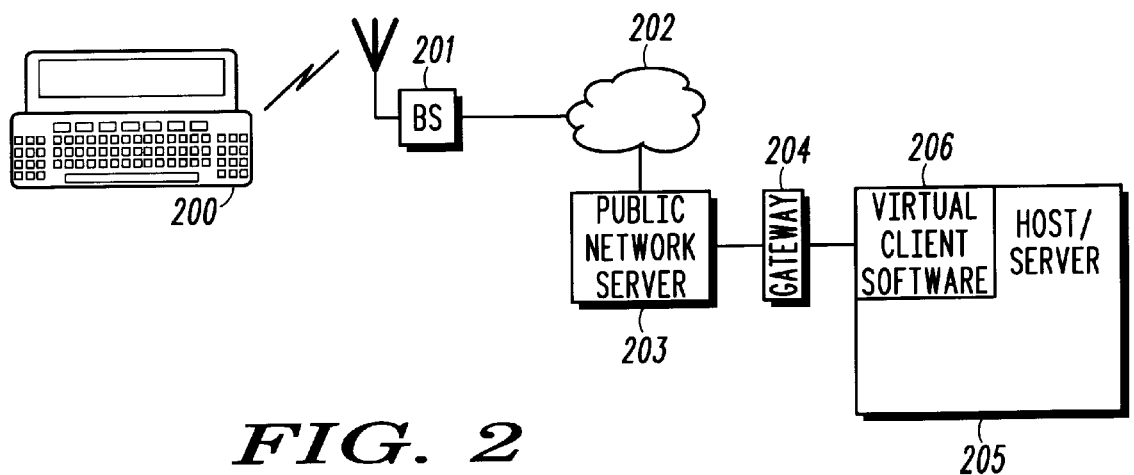
FIG. 2 shows a two-way radio communication system in accordance with the present invention.

Referring to FIG. 2, a radio communications system is shown comprising a radio device 200 in the form of a two-way pager, preferably a PageWriter (trademark) pager available from Motorola, Inc. at 200 North Point Center East Street 100, Alpharetta, Ga., 30202, USA. The radio device 200 is in communication with a base station 201 of a public asymmetric two-way paging system 202, having a public network server 203. Such a system is provided, for example, under the trademark Skytel. Connected to the public network server 203 via a gateway 204 is a private network server 205, referred to as a "host" server. The term "host" indicates that certain communications devices are associated with the host server 205, i.e., are registered with that host server. Such communication devices include LAN-connected terminals (described below) and include the radio device 200. The host sever 205 has virtual-client software 206, described in greater detail below.

The radio device 200 may be a two-way pager or a portable computer with radio capability, for example, a portable computer having a modem. The network 202 is not necessarily an asymmetric paging network, but can alternatively be a symmetric radio network, such as the "ARDIS" network. The base station 201 is shown for illustration only. The network 202 will in fact have many base stations dispersed around the nation. The network 202 is shown as having a single base station 201 for two-way communication with the radio device 200, but an alternative arrangement is possible in which there are many more receivers than transmitters in the network 202. The gateway 204 between the public network server 203 and the host server 205 is preferably an internet connection, but can take many forms. The connection may be a dedicated connection, or a public ISDN connection, or an analog modem connection. The gateway 204 could even be a radio connection into the network 202.

Figure 3:
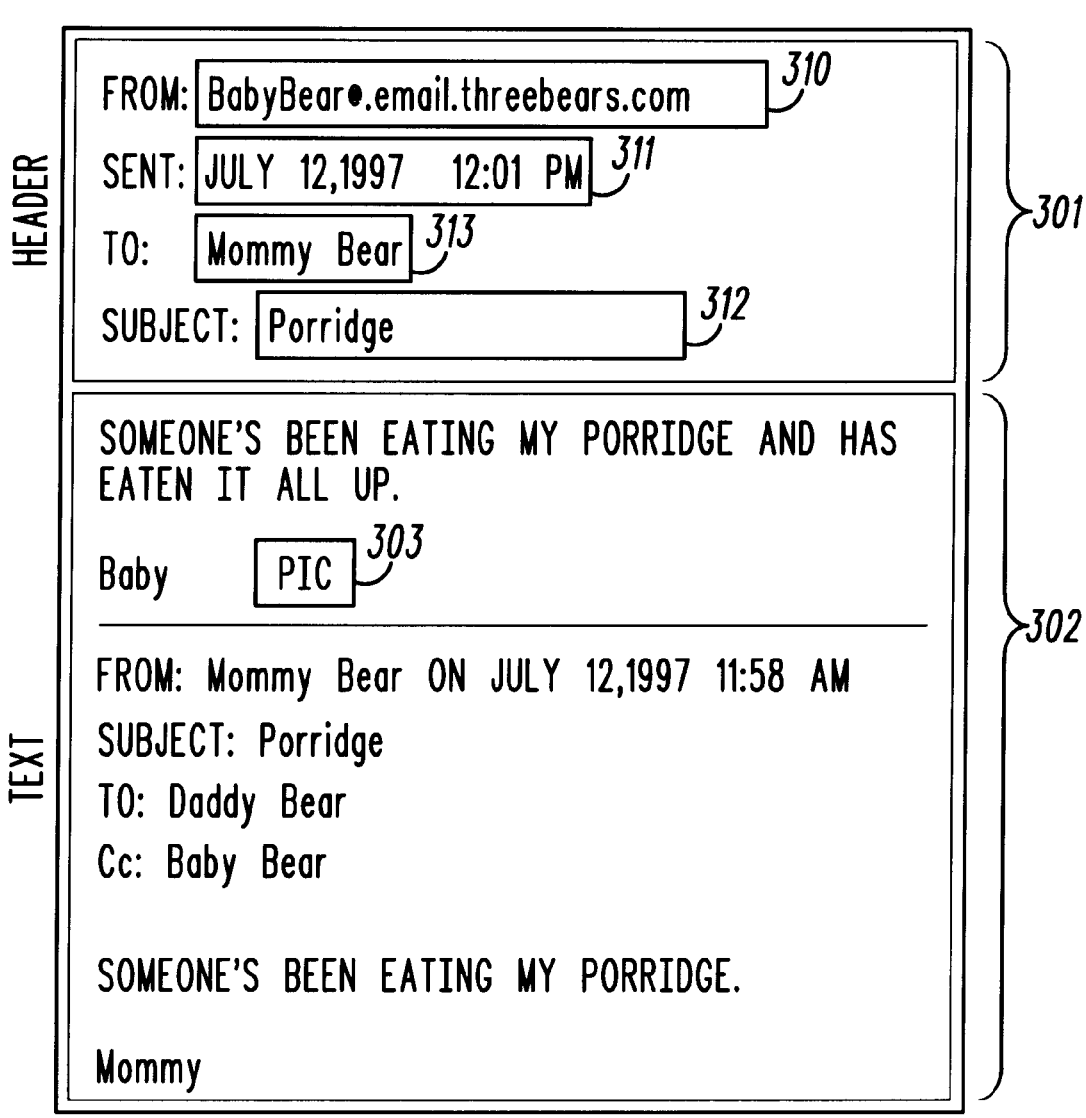
FIG. 3 shows an example of an e-mail message for purposes of illustration.

Referring to FIG. 3, an example of an electronic mail (e-mail) message is shown. The message comprises a header 301 and a body or text 302. The message is also shown as having an attachment 303, for example a picture. Within the header there is a sender field 310, a date and time field 311 and a subject field 312. There is also an address field illustrated here as field 313. A further field is typically available (but not shown in FIG. 3), this being a cc field, indicating other recipients of the message. The attachment 303 can be included within the body of the message, or there may be an information field in the header 301, indicating the existence of the attachment and (optionally) the nature of the attachment.

In a prior art e-mail system using a radio network connection, it is known to present information from the header 301 at a radio device, in the form of a summary page summarizing, typically in column form, senders of messages, times of receipt and subject. It is a problem that the text 302 of a message can be very long. In the example given in FIG. 3, there is a message from Baby Bear to Mommy Bear, but as a continuation of this message, there is an earlier message from Mommy Bear to Daddy Bear. It is quite typical for multiple messages to be stacked together in a lengthy text. To send an entire message to a radio device can result in extensive and unnecessary usage of the limited and valuable capacity of the radio channel. Additionally, it is illustrated in FIG. 3 that there is an attachment 303, which is a picture imbedded in the body of the text 302. Attachments are commonly even larger than the text in which they are embodied. Pictures, for example, represent very large data files. The recipient of the message may not need the attachment or may not have the capability of viewing the attachment.

The manner in which a message such as the message shown in FIG. 3 is handled by the system illustrated in FIG. 2 will be described, and for the purposes of description, further details of the system on FIG. 2 are described with reference to FIG. 4. In the following description, elements already described with reference to FIG. 2 are not described again.

Figure 4:
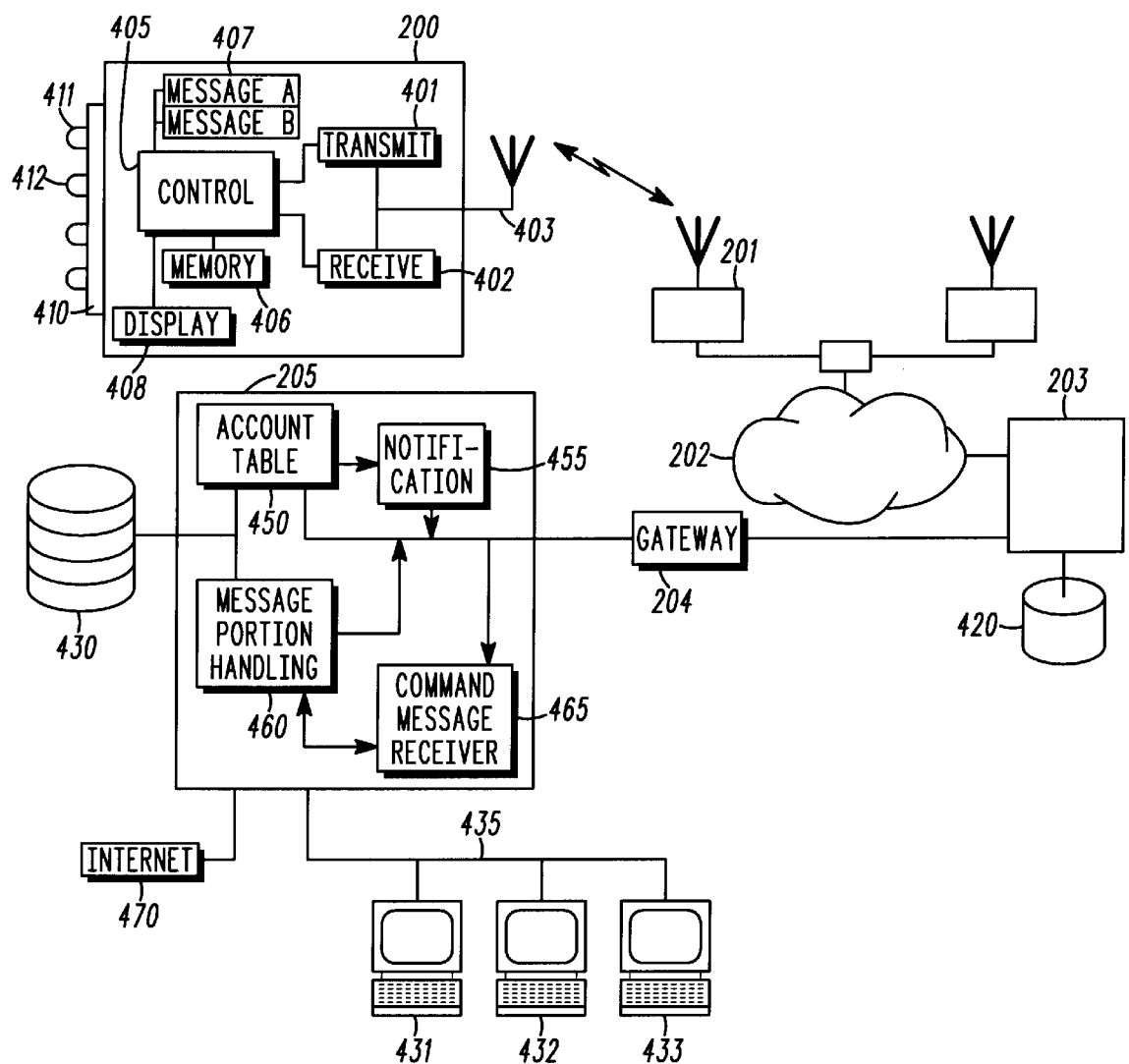
FIG. 4 shows details of the communication system of FIG. 2.

Referring to the radio device 300 illustrated in FIG. 4, it is shown as having a transmitter 401 and receiver 402 coupled to an antenna 403 (e.g., using a duplexer or antenna switch, neither of which is illustrated). The transceiver 40 and receiver 402 are connected to a control circuit 405, preferably a microprocessor. The control circuit 405, has associated memory 406 and has prestored message memory 407. The memory 406 and the associated message memory 407 can indeed be the same memory circuit. Also shown connected to the control circuit 405 is display 408 and a keyboard 410. Due to the small size of the device 200, the keyboard 410 is necessarily very restricted. It preferably has a key for each letter of the alphabet, but can be limited to fewer keys even than this. In a selected mode of operation of the device 200, selected keys of the keyboard 410, e.g. keys 411 and 412, correspond to selected messages in the message store 407.

Referring to the host server 205, there is an e-mail database 430, forming part of the host server 205 and there are computer terminals 431, 432 and 433 connected to the server 205 via a local area network 435. The terminals 431 to 433 and the local area network 435 are optional, but are included to assist in an explanation of the invention.

The host server 205 has virtual client software 206 which interacts with client software in the radio device 200. The virtual client software includes an account table 450, in which account numbers or identifiers in the e-mail server database 430 are correlated with account numbers or identifiers in the public network server 203. Also included in the virtual client software of the host server 205 are a notification agent 455, a message portion handling routine 460 and a command message receiver 465. In operation, users can use the terminals 431 to 433 to generate e-mail messages and send these e-mail messages to each other and to other recipients outside the local area network 435. Where messages are to be sent to other recipients, they can be sent by the server 205 to internet connection 470. A user of a terminal, e.g., terminal 431, can view a page which displays summary information of all his incoming messages and a page summarizing all his outgoing messages. Each of these pages shows the receiver (or sender) of the message, the time and the subject header. This information is presented to the terminal from the e-mail database 430. In the database 430, there is a section allocated to each user. Sections of the database 430 are identified by user account number. Thus, for example, referring to the message of FIG. 3, each of Daddy Bear, Mommy Bear and Baby Bear has an account in the database 430. Each account is identified (in the example given) simply by the account holder's name. These accounts can be referred to as e-mail accounts. If a user of a terminal, e.g., terminal 431, wishes to see a particular message in his account, he can select that message and the server 205 will deliver the entire message, including the entire header and the entire text and all attachments from the database 430 to the terminal 431.

Referring now to the radio device 200, this device is able to act in almost the same manner as a terminal 431, but with certain differences in function and user interaction as described below. Radio device 200 first establishes a virtual session with server 205 in a manner described in U.S. patent application Ser. No. 08/557657 of Eggleston, et al., filed on Nov. 13, 1995 and assigned to the assignee of the present invention. That application is incorporated herein by reference. In the course of establishing a virtual session, device 200 sends a message directed at server 205 indicating the e-mail account in server database 430 to which device 200 wishes to have access. In so doing, a correlation is entered into account table 450 correlating the e-mail account number or identifier with the paging network address of the pager 200.

By the way of explanation of paging network addresses, each pager or other radio device 200 registered on the public radio network 202 has an address and a corresponding account in a database 420, associated with public network server 203. Account table 450 maintains a table of correlations between e-mail account numbers or identifiers in database 430 with public network account numbers in database 420. In this manner, when a message is received from a given radio device 200, server 205 receives the message with an identification indicating the radio device from which it is received and is able to correlate that radio device with the appropriate e-mail account number. Similarly, when an e-mail is addressed to a particular account number and needs to be sent to the user of that account at his radio device 200, the appropriate address of the radio device is identified in account table 450 and the message is sent to the correct radio device.

Radio device 200 is able to generate a number of pre-identified messages stored in message storage 407. Some of these messages are commands. The commands that can be sent include "OK," "Finish," and "Move."

In operation, message portion handling routine 460 sends to the radio device 200 a selected list of headers of messages in the in-box for the account in database 430 that corresponds to the radio device 200. The headers are short, giving merely the sender of a message (field 310 of FIG. 3) the date or time (field 311) and the subject (field 312) or a portion of the subject field. Rules are set up by the individual user in database 430 defining how many and what form of header information the user wishes to receiver in viewing his in-box. For example, the user can set up a rule which provides that only the last 10 messages are shown or he can set up a rule which provides that only messages received in the last 24 hours are shown. For each message, a predetermined limit is set for the amount of text from the body of the message that is sent to the radio device 200.

Preferably, the first few lines of text are all that is sent upon receipt of the view command. In this manner, the network 202 is not tied up and overused by having to send the entire text 302 of the e-mail message. Similarly, the memory 406 of the device 200 (which is very limited) is not congested with lengthy e-mail message text and with attachments. A limit of 300 characters is a suitable limit.

If the user 200 needs more of the message, a further button (or a repeat of the previous button) can be pressed, causing another command (e.g., the command "move") to be sent to the server 205, causing the next few lines of text to be sent to the radio device 200. In this way, a user can continue receiving further portions of a message until he is satisfied that he has understood enough of the message for his purposes. For example, a message may require the setting up of a meeting and the user can page through the message until he has received the time, place and date of the meeting and the uses may not wish to review any more of the message until he has returned to his office. When the user of the radio device 200 returns to his office, he can use one of the terminals 431 to 433 to read the complete message, print it off and read any attachments.

Figure 5:
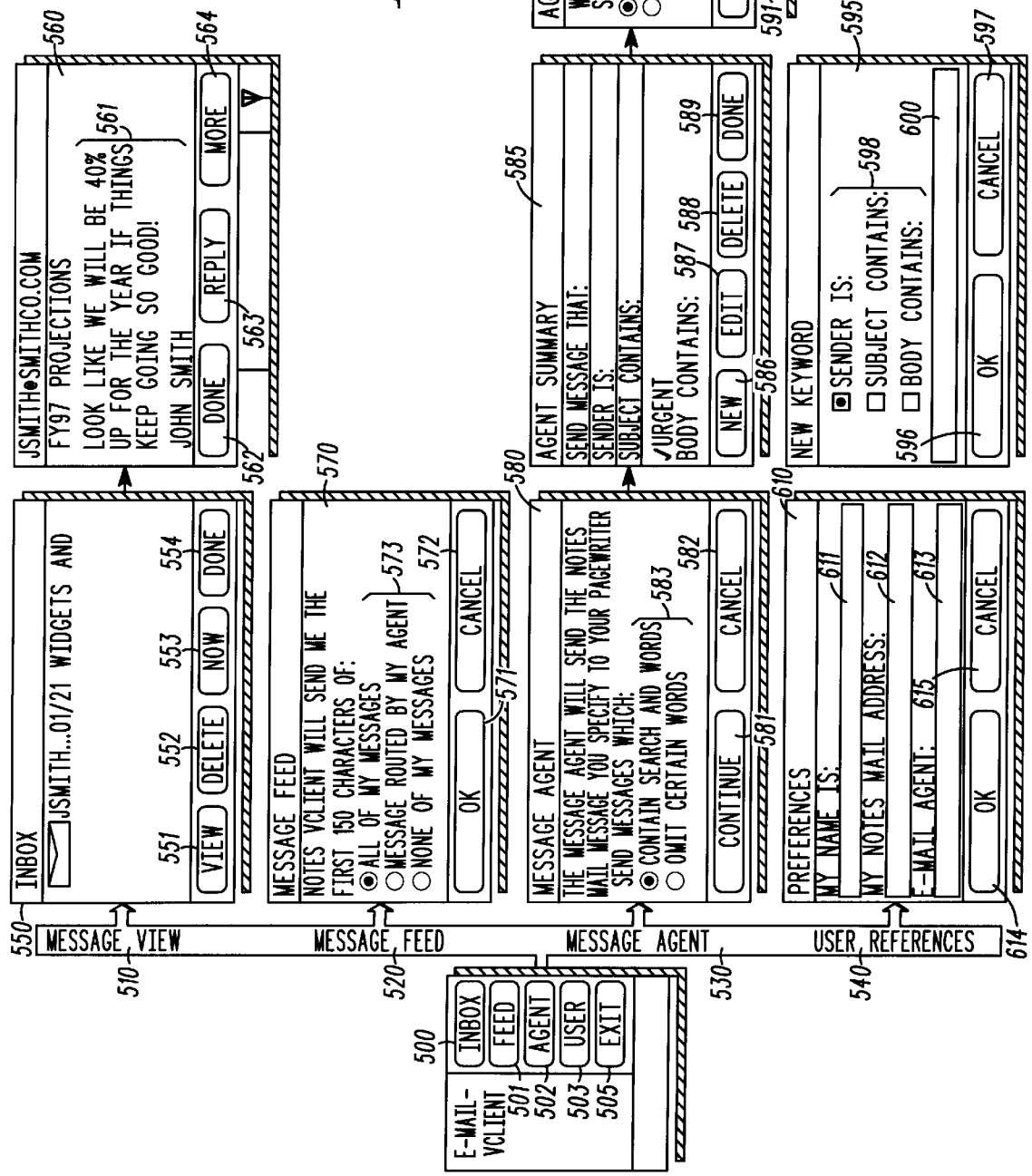
FIG. 5 shows screen shots of screens that appear on a display of the radio device of FIG. 2.

Referring now to FIG. 5, a series of examples of screen shots displayed on the display 408 of a radio device 200 are shown. Each screen shot represents a mode of operation of the radio device. Accordingly, there is a software routine in the control circuit 405 of radio device 200 which corresponds to each of the nine screen shots in FIG. 5. FIG. 5 could equally be presented as a state diagram illustrating the transitions between these respective software routines.

In FIG. 5, there is an opening screen 500, which is of a highest level mode, which is presented to a user upon power-up of the radio device 200. As a function of the process of powering-up and presenting of the screen 500, the radio device 200 establishes a virtual session with the public network server 203 of the public radio network 202. Screen 500 shows five on screen buttons 501 to 505. These are labeled "in-box," "feed," "agent," "user" and "exit." Preferably, the five on-screen buttons, 501 to 505 correspond to five hardware buttons on the keyboard 410, such as buttons 411 and 412, etc. Alternatively, the display 408 may have a digitizer, and a stylus can be used to select and activate on-screen buttons. Each of buttons 501 to 504 represents a mode of operation illustrated on the right of screen 500. These modes of operation are message view mode 510, message feed mode 520, message agent mode 530 and user preferences mode 540.

In the message view mode 510, the first screen presented is an in-box screen 550. This screen has four on-screen buttons 551, 552, 553 and 554. These buttons correspond to the commands "view," "delete," "new" and "done." Screen 550 illustrates the contents of the user's in-box as stored in server database 430 (FIG. 4). The information is presented in the form of rows illustrating, for each message, the sender, the date of receipt and a portion of the subject field. By activating button 551 (using keypad 410 or using a stylus) the process proceeds to screen 560. Screen 560 presents the sender, date of receipt and subject of the message and also presents a portion of the text of the message. The portion 561 of the text is only a few lines of text. The size of the portion 561 is either predetermined (e.g., selected to fit within the display 408) or is selectable by the user defining a preference for the length of the message portion. Other arrangements can be devised for limiting the size of the message portion 561, for example, the message portion can be terminated at a given character or set of characters. As an example, the message can be terminated at the occurrence of the first or second carriage return symbol.

Screen 560 has three on-screen buttons, 562, 563 and 564 correspond to the commands "done," "reply" and "move." Further buttons (not shown) can be caused to appear corresponding to the commands "delete," "forward," and "reply."

Turning to message feed mode 520, activation of this mode by activation of button 502 presents screen 570. This screen has on-screen buttons 571 and 572 corresponding to the commands "OK," and "cancel." Screen 570 also has some mode select buttons 573.

Referring to message agent mode 530. Activation of this mode presents message agent screen 580 having "continue" and "cancel" buttons 581 and 582 and having preference selection buttons 583. From screen 580, the process can proceed to screen 585 (agent summary screen) having buttons 586 through 589 representing the command "new," "edit," "delete," and "done."

From agent summary screen 585 the process can proceed to agent action screen 590, which presents "finish" button 591 and "cancel" button 592. There are various other preference buttons are illustrated on the screen 590. Alternatively from screen 585, the process can proceed to screen 595, having buttons 596 and 597 representing the commands "OK" and "cancel." Screen 595 also has user preference buttons 598.

Finally, user preference mode 540 causes the presentation of screen 610 having entry field 611, 612 and 613 and having command buttons 614 and 615 for the commands "OK" and "cancel."

In operation, the application opens with screen 500. From this screen the user can proceed to one of the four modes of operation 510 to 540 using the buttons 501 to 504, respectively. Alternately, by pressing button 505 "exit," the application quits and returns to a default application unrelated to the function of messaging. Upon selection of message feed mode 520, screen 570 is presented in which the user can select whether he wishes all messages or only messages routed by the user's agent or no messages to be fed to the radio device 200.

Upon selecting one of the first two preferences and activating button 571, a message is sent from the user device 200 to the server 205 instructing the server 205 to begin sending (feeding) messages to the radio device 200. The message sent from the radio device 200 to the server 205 indicates, according to buttons 573, whether all messages in the in box are to be fed or whether only those messages that are identified by an agent (described below) are to be fed to the radio device 200. Upon receipt of this message at command message receiver 465, server 205 commences sending through the gateway 204 and through the public radio network 202, for each of the desired messages the header and a portion of the text. Once sent, the messages can be viewed at the radio device 200 as shown in screens 550 and 560.

Referring to mode 530, this mode is activated by pressing 503 and brings up screen 580 which allows the user of the radio device 200 to define a set of rules (to be stored in database 430) defining the messages or forms of messages or types of messages that the user of the radio device 200 wishes to receive. Thus, for example, selection buttons 583 can call for messages which contain certain words or messages which omit certain words. Progressing from screen 580, button 581 can be pressed closing the program to proceed to screen 585, the agent summary screen. Screen 585 summarizes the messages that are to be sent from the server 205 to the radio device 200. For example, messages can be selected identified by sender or by subject key word or by urgency flag or by body (text). By activating the button 586, the program proceeds to screen 595 and a new key word can be entered. The field to be searched is selected by preference buttons 598 and a key word is entered in field

600. The key word entered in field 600 can cause a search by the server 205 in the sender field, the subject field or the body field, according to the selection made in section buttons 598.

By pressing edit button 587 in screen 585, agent action screen 590 is presented, inviting the server 205 to send the entire message or only the first predefined number of characters or only the sender or only the sender and subject when the key words match. By activating button 591, a message is sent to the command message receiver 465 of the server 205 identifying the agent actions defined by the user. These agent actions are stored as a rule in database 430 and thereafter define the degree of filtering of messages from the user's in box to the radio device 200.

By activating user preference mode 540 the user can enter his name in field 611, his e-mail address in field 612 and his e-mail alert in field 613. By pressing button 614, a message is sent to the server 205 and received at the command message receiver 465. This message can entirely change the e-mail address of the user of the radio device 200, causing an update in the account table 450 showing a new correspondence between an e-mail address and a pager address. This feature allows a user of the radio device 200 to permit a fellow user to enter an e-mail address and to permit a different e-mail account to be viewed.

Summarizing FIG. 5, it has been described how four modes of operation of a software program stored in controller 405 of radio device 200 are available. The message view mode allows the user of device 200 to view e-mail messages from the e-mail server 205. Message feed mode 520 instructs the server 205 to begin transmitting a user's messages from the e-mail server to the radio device 200. The message agent mode 530 allows a user of the device 200 to remotely set up a set of filtering parameters or rules to be stored in database 430 and to be associated with the user's e-mail account. This set of rules or filtering parameters defines the types of messages or aspects of messages that the user wishes to view remotely. This feature has the great advantage of flexibility in allowing the user to select messages to be presented at the radio device 200. This feature is most useful in a device having a very limited screen size and memory capacity, because indiscriminate presentation of all messages to the radio device can unnecessarily fill up the memory and fill up the screen, causing irritation to the user.

Finally, user preferences mode 540 allows the user to identify himself to the server 205 to identify which particular e-mail account is to be viewed, independent of the address of the radio device 200 in the public radio network 202.

Figure 6:
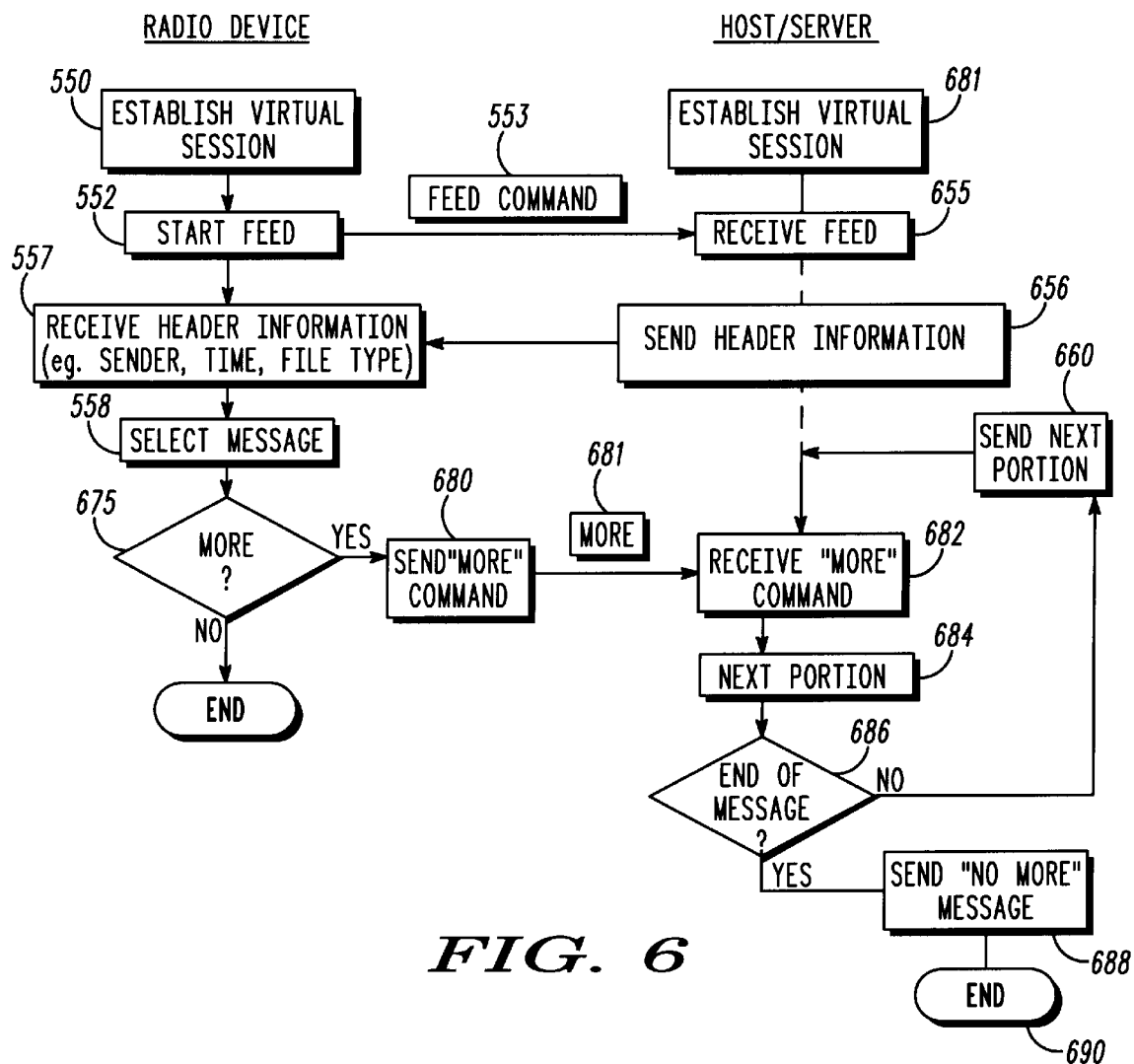
FIG. 6 shows a flow diagram illustrating certain operations in the radio device of FIG. 2.

Referring to FIG. 6, a flow diagram is shown describing the operation of the radio device 200 in association with the host server 205. Steps that take place at the radio device 200 are shown on the left and steps that take place at the host server 205 are shown on the right. Arrows between the left and right hand sides of the diagram represent messages (including command messages) exchanged between the radio device and the server. FIG. 6 is presented by way of illustration of the process of starting the feed of messages from the host server to the radio device, reading of a portion of the message and requesting of more of the same message. Flow diagrams similar to the diagram in FIG. 6 can readily be created by one skilled in the art to illustrate the other operations and interactions between the radio device and the server described above with reference to FIG. 5.

Referring in detail to FIG. 6, the flow begins by establishing a virtual session between the radio device 200 and the host server 205. This establishment of a virtual session takes place at steps 650 in the radio device and 651 in the host server. Following commencement of a virtual session, and following activation of on-screen key 502, a command to start feed is generated. This command (feed command 653) is sent to the server and received at the server in step 655. On receipt of this command, the server sends header information in step 656 and this information is received at the radio device in step 657.

Upon activation of the "view" button 551 in screen 550, a message is selected (step 658) and displayed on the display of the radio device. Flow proceeds to step 675. At step 675, if the user requires more of the message, he presses on-screen button 564 and flow proceeds from step 675 to step 680, causing a command 681 to be generated and sent to the server requesting more of the message. This command is received at step 682 and in step 684 a counter is incremented to identify the next portion of the message. If, in step 686, there is no more message to be sent, i.e., the counter has reached the end of the message, an error command can be sent in step 688, indicating that there is no more message to be sent and the process ends at 690. On the other hand, if step 686 identifies that there is more message to be sent, flow proceeds to step 664 and an outbound paging message is formatted to deliver the next portion of the body of the message and the process continues.

The above description has been given by way of example only and modifications of detail can be made by one of ordinary skill in the art without departing from the spirit and scope of the invention.

What is claimed is:

1. A communications system comprising:

a first server having an electronic mail (e-mail) database for managing e-mail accounts, for storing radio device addresses associated with those accounts, and for storing electronic mail messages associated with those accounts wherein each message has a header and text;

a gateway connecting the first server to a two-way radio network;

a radio device having a electronic messaging application, the radio device comprising a message generator and transmitter for generating a command and transmitting the command to the server over the two-way radio network to request a further portion of the text and being capable of two-way communication over the two-way radio network;

wherein the first server comprises message handling software arranged to send, to the radio device, a portion of a message of a user-selectable predetermined size, including a header portion and a text portion, the first server further maintaining a database of e-mail messages associated with e-mail account identifiers and the radio network comprising a second server maintaining a database of paging messages associated with pager addresses, and wherein the first server maintains a table correlating e-mail account identifiers with pager addresses.

2. The system of claim 1 wherein the radio devices comprises means for entering a filter parameter and sending a message to the first server including the filter parameter.

3. The system of claim 2, wherein the first server maintains filtering rules for selecting messages to be fed to the radio device according to a filtering parameter received from the radio device.

4. The system of claim 1 wherein the radio devices comprises means for entering a message length parameter and sending a message to the first server including the message length parameter.

5. The system of claim 4, wherein the first server maintains a message portion handling routine for feeding portions of messages to the radio device truncated in length according to the message length parameter.

6. The system of claim 1 wherein the first server further comprises means for generating a notification message for sending over the two-way radio network to a radio device having a given radio device address when a message is received at the server addressed to an e-mail account corresponding to that address.

* * * * *